(12) United States Patent
Murakami et al.

(10) Patent No.: US 8,893,346 B2
(45) Date of Patent: Nov. 25, 2014

(54) OPTICAL CONNECTOR CLEANER

(71) Applicants: NTT Advanced Technology Corporation, Tokyo (JP); US Conec Limited, Hickory, NC (US)

(72) Inventors: Masayuki Murakami, Tokyo (JP); Masaru Kobayashi, Tokyo (JP); Masaaki Konishi, Tokyo (JP); Yuki Hiramoto, Tokyo (JP); Toshiaki Satake, Hickory, NC (US); Jillcha Fekadu Wakjira, Hickory, NC (US); David Brian Teague, Columbia, SC (US)

(73) Assignees: NTT Advanced Technology Corporation, Tokyo (JP); US Conec Limited, Hickory, NC (US)

( * ) Notice: Subject to any disclaimer, the term of this patent is extended or adjusted under 35 U.S.C. 154(b) by 52 days.

(21) Appl. No.: 13/744,198

(22) Filed: Jan. 17, 2013

(65) Prior Publication Data

US 2013/0185883 A1    Jul. 25, 2013

(30) Foreign Application Priority Data

Jan. 19, 2012 (JP) .................................. 2012-009136
Jan. 16, 2013 (JP) .................................. 2013-005219

(51) Int. Cl.
| G02B 6/00 | (2006.01) |
| B08B 1/00 | (2006.01) |
| A47L 1/15 | (2006.01) |
| G02B 6/38 | (2006.01) |

(52) U.S. Cl.
CPC ................. *A47L 1/15* (2013.01); *G02B 6/3866* (2013.01)
USPC ............ 15/210.1; 15/97.1; 385/134; 385/147

(58) Field of Classification Search
CPC .......................... B08B 2240/02; G02B 6/3866
USPC ......................... 15/97.1, 210.1; 385/134, 147
See application file for complete search history.

(56) References Cited

U.S. PATENT DOCUMENTS

| 5,117,528 | A | * | 6/1992 | Kanayama et al. .......... 15/210.1 |
| 5,735,013 | A | * | 4/1998 | Yaguchi et al. .............. 15/210.1 |
| 7,837,801 | B2 | * | 11/2010 | Christopher et al. ............. 134/6 |

FOREIGN PATENT DOCUMENTS

| JP | 03-290888 | 12/1991 |
| JP | 08-101326 | 4/1996 |
| JP | 2002-214476 A | 7/2002 |
| JP | 2003-057489 A | 2/2003 |
| JP | 2003-200116 A | 7/2003 |
| JP | 2003-290722 A | 10/2003 |
| JP | 2005-181971 A | 7/2005 |
| JP | 2008-152229 A | 7/2008 |

* cited by examiner

*Primary Examiner* — Mark Spisich
(74) *Attorney, Agent, or Firm* — Blakely Sokoloff Taylor & Zafman

(57) ABSTRACT

An optical connector cleaner comprising a supply reel, a take-up reel, a case, an operation lever, a take-up mechanism, and a holding member. The supply reel stores a cleaning cloth member having one end side wounded thereon. The take-up reel takes up the other end side of the cleaning cloth member. The case has a connector connection portion on which the cleaning cloth member is exposed. The operation lever that has an operation portion projecting from the case and is swingably supported. The take-up mechanism rotates the take-up reel in a take-up direction by a predetermined angle when the operation lever swings. The holding member holds an optical connector on the connector connection portion in a state in which a coupling face of the optical connector is pressed against the cleaning cloth member exposed to the connector connection portion.

6 Claims, 11 Drawing Sheets

OPTICAL CONNECTOR CLEANER

TECHNICAL FIELD

The present invention relates to an optical connector cleaner for cleaning the coupling face of an optical connector by a cleaning cloth member.

BACKGROUND ART

A conventional optical connector cleaner of this type is described in, for example, Japanese Patent Laid-Open No. 2003-290722. The optical connector cleaner disclosed in patent literature 1 includes a case that is as large as a user can grip it by hand, a cleaning tape stored in the case, and a feed mechanism for feeding the tape.

The case has an opening portion to expose the cleaning tape. The cleaning tape is designed to be fed from a supply reel via the opening portion and taken up by a take-up reel. The feed mechanism rotates the take-up reel when the user presses a lever provided on the case.

To clean the coupling face of an optical connector using the conventional optical connector cleaner, the user grips the case by one hand and the optical connector by the other hand, and wipes the optical connector on the cleaning tape exposed to the opening portion. If the cleaning tape gets dirty, the user presses the lever to expose the unused cleaning tape to the opening portion.

DISCLOSURE OF INVENTION

Problems to be Solved by the Invention

The conventional optical connector cleaner disclosed in patent literature 1 produces a different cleaning result for a different user. This is because the force of pressing the optical connector against the cleaning tape changes depending on the user, and the moving speed and length of the optical connector along the cleaning tape are hard to be made constant.

In addition, the optical connector cleaner described in patent literature 1 needs the operation of wiping the optical connector on the cleaning tape and the operation of pressing the lever to expose the unused cleaning tape to the opening portion. This makes the cleaning operation cumbersome.

The present invention has been made to solve the above-described problems, and has as its first object to provide an optical connector cleaner capable of obtaining a predetermined cleaning result even if the user has changed. It is a second object of the present invention to provide an optical connector cleaner that allows the user to complete cleaning of an optical connector by one operation at the time of cleaning.

Means of Solution to the Problems

In order to achieve the objects, an optical connector cleaner according to the present invention comprises a supply reel that stores a cleaning cloth member having one end side wounded thereon, a take-up reel that takes up the other end side of the cleaning cloth member, a case that has a connector connection portion on which the cleaning cloth member stretched from the supply reel to the take-up reel is exposed, and rotatably supports the supply reel and the take-up reel, an operation lever that has an operation portion projecting from the case and is swingably supported by the case, a take-up mechanism that is provided between the operation lever and the take-up reel and rotates the take-up reel in a take-up direction by a predetermined angle when the operation lever swings, and a holding member that holds an optical connector on the connector connection portion in a state in which a coupling face of the optical connector is pressed against the cleaning cloth member exposed to the connector connection portion.

The present invention is characterized in that a press mechanism is provided between the operation lever and the holding member, the press mechanism transmitting, to the holding member, an operation force applied to the operation lever and pressing the holding member against the optical connector at a predetermined timing with respect to a timing the take-up reel starts rotating by driving of the take-up mechanism.

The present invention is characterized in that the operation lever is formed to swing with respect to the case so that the operation portion comes into contact with or separates from the connector connection portion, the holding member comprises a press arm located between the connector connection portion and the operation portion of the operation lever, and swings with respect to the operation lever so that the press arm comes into contact with or separates from the optical connector loaded on the connector connection portion, and the press mechanism comprises a spring that biases the press arm to a side of the connector connection portion with respect to the operation lever, and a stopper that allows an interval between the operation lever and the press arm to decrease and controls the interval not to exceed a predetermined interval.

The present invention is characterized in that a portion for supporting the supply reel and the take-up reel in the case is formed from one cartridge that is formed to store the supply reel and the take-up reel and be detachable from remaining portions of the case.

The present invention is characterized in that the cartridge comprises a guide member on which the optical connector detachably fits, and a pressure receiving member located on a side opposite to the optical connector fitting on the guide member with respect to the cleaning cloth member, the guide member being formed to fit in a direction in which the optical connector is pressed by the holding member, and the pressure receiving member pressing the optical connector via the cleaning cloth member by a spring force of a spring.

The present invention is characterized in that a shaft portion of the take-up reel, which takes up the cleaning cloth member, is formed to gradually decrease a diameter from one end to the other end in an axial direction.

The present invention is characterized in that the optical connector has the coupling face formed on one side surface in a direction perpendicular to a longitudinal direction of an optical fiber, and is loaded on the connector connection portion such that the longitudinal direction becomes substantially parallel to the axial direction of the take-up reel.

Effects of the Invention

To clean the coupling face of an optical connector using the optical connector cleaner according to the present invention, the optical connector is held on the connector connection portion of the case in advance by the holding member. Then, in this state, the operation lever swings with respect to the case. When the operation lever is operated in this way, the take-up reel rotates in the take-up direction by a predetermined angle by driving of the take-up mechanism, and the cleaning cloth member moves while wiping the coupling face of the optical connector. The coupling face is wiped by the cleaning cloth member and thus cleaned.

The force of pressing the coupling face of the optical connector against the cleaning cloth member is applied by causing the holding member to hold the optical connector. For this reason, the force is not affected by the magnitude of the operation force of the user and is constant even if the user changes. In addition, the moving length of the cleaning cloth member corresponds to the operation amount of the operation lever. For this reason, the cleaning cloth member moves from one end to the other end of the movable range of the operation lever in a proper length at the time of cleaning.

Hence, according to the present invention, it is possible to provide an optical connector cleaner capable of always obtaining a constant cleaning result even if the user has changed.

In the optical connector cleaner according to the present invention in which the press mechanism is provided between the operation lever and the holding member, when the user operates the operation lever, the holding member holds the optical connector on the connector connection portion. For this reason, in the present invention, holding the optical connector and moving the cleaning cloth member can be done at once by operating the operation lever.

Hence, according to the present invention, it is possible to provide an optical connector cleaner that allows the user to complete cleaning of the optical connector by one operation at the time of cleaning.

BEST MODE FOR CARRYING OUT THE INVENTION

An embodiment of an optical connector cleaner according to the present invention will now be described in detail with reference to FIGS. 1 to 19.

An optical connector cleaner 1 shown in FIGS. 1 to 4 is formed by assembling members to be described later to a case 2 formed into a size as large as a user (not shown) can grip it by hand.

Figure 12:
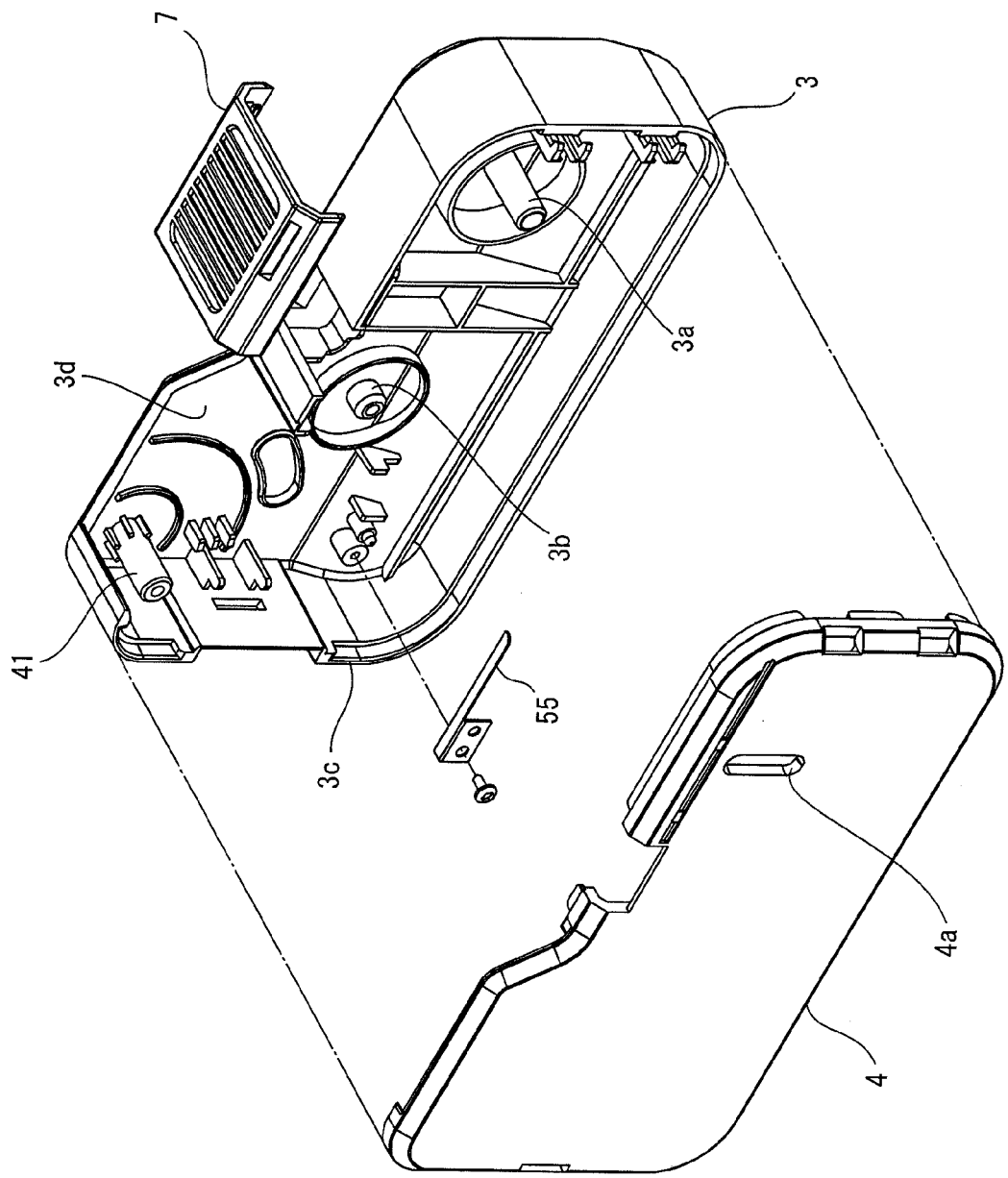
FIG. 12 is an exploded perspective view of a case.

As shown in FIG. 12, the case 2 includes a body 3 formed into a box shape with one side open, and a cover 4 that covers the opening portion of the body 3. The cover 4 is detachably attached to the body 3.

The case 2 includes a connector connection portion 6 to load an optical connector 5 (see FIG. 15) and a shutter 7. The shutter 7 is supported by the body 3 and the cover 4 so as to be movable between a use position (see FIGS. 1, 2, and 4) to expose the connector connection portion 6 and a storage position to cover the connector connection portion 6.

Figure 15A:
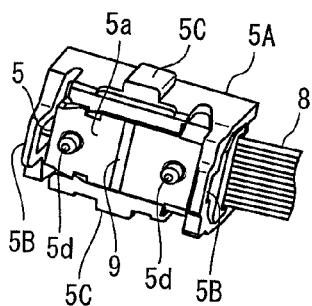
FIGS. 15A and 15B are a perspective view and a sectional view, respectively, showing the optical connector together with an optical module facing the optical connector.

The optical connector 5 to be cleaned by the optical connector cleaner 1 of this embodiment is called a PRIZM® Light Turn® Connector, which has been developed as an interface to transmit a high-speed optical signal and allows high-density packaging. The optical connector 5 is formed from a transparent plastic material, and has an optical fiber 8 connected to one end side in the longitudinal direction, as shown in FIG. 15. A coupling face 9 is formed in one side surface 5a of the optical connector 5 in a direction perpendicular to the longitudinal direction of the optical fiber 8.

Figure 15B:
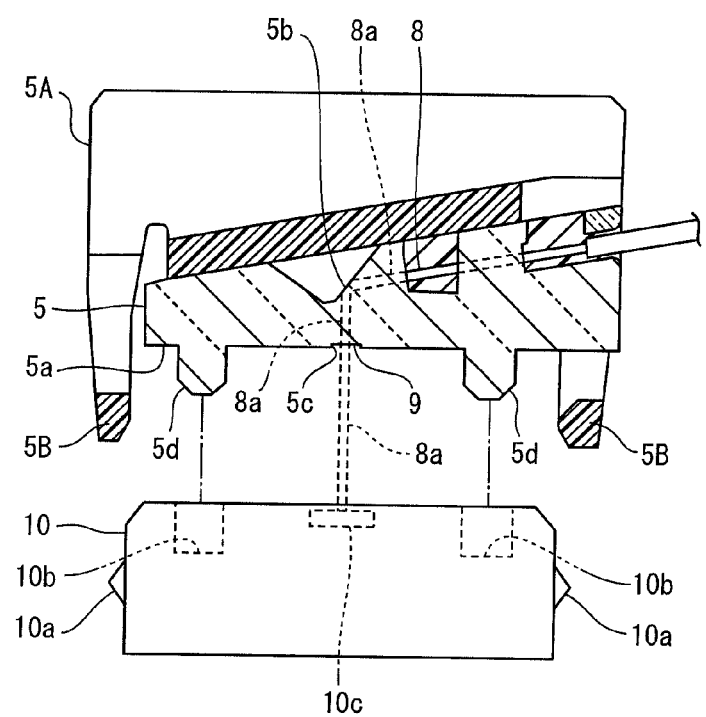

The optical connector 5 incorporates a reflecting lens 5b, as shown in FIG. 15B. The reflecting lens 5b is provided to change the traveling direction of a light beam 8a and pass it through the optical fiber 8 and the coupling face 9.

The optical connector 5 implements optical coupling between the optical fiber and a light emitting/receiving element surface-mounted on a printed board. Communication light sent upward from the light emitting element to the board is input from the coupling face 9 into the optical connector 5 and is guided to the optical fiber 8 led in the horizontal direction.

On the other hand, communication light from the optical fiber 8 is output downward from the coupling face 9 of the optical connector 5 and received by the light receiving element mounted on the printed board. Although the light emitting element and the light receiving element are close to the coupling face 9, a gap exists between them. If the coupling face 9 is dirty, the communication light is shielded, affecting the communication.

The coupling face 9 is formed as the bottom surface of a shallow concave groove 5c traversing the side surface 5a. That is, the coupling face 9 of the optical connector 5 is difficult to clean due to the following two reasons. First, the coupling face 9 is made of the plastic material and is therefore softer relative to a glass material. This leads to a variation in the force of pressing the cloth against the connector and thus damages the end face.

Second, the coupling face 9 is formed to be recessed from the side surface 5a. It is therefore impossible to clean the while surface of the concave groove using a hardly deformable cloth as before. Hence, the coupling face 9 cannot be cleaned using the conventional general optical connector cleaner.

To clean the coupling face 9, a solvent such as IPA is usable. However, this cleaning method cannot be performed because the optical connector 5 is often used in a clean room for electronic packaging. This is because no volatile solvent is usable in a closed clean room. The optical connector cleaner 1 according to this embodiment can clean the optical connector 5 that cannot be cleaned by such a conventional cleaner.

A cover 5A is attached to the optical connector 5 shown in FIG. 15 which is of a so-called core wire type. The cover 5A is configured to fix the optical connector 5 to an optical module 10 (see FIG. 15B) on the printed board (not shown), and includes a pair of arms 5B that engage with projections 10a provided on the two side portions of the optical module 10. In addition, projections 5C are provided on two side portions of the cover 5A, respectively, where the arms 5B are not formed.

Figure 8:
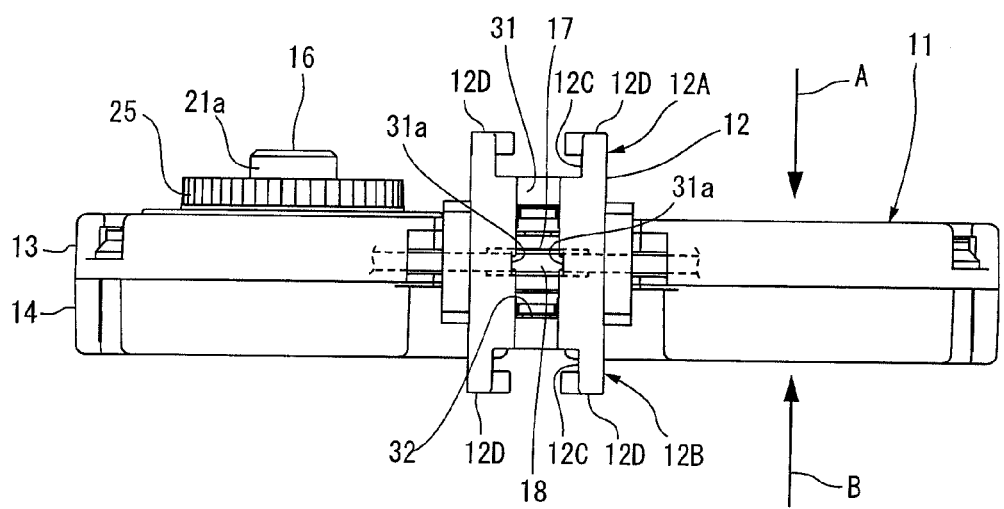
FIG. 8 is a plan view of the cartridge.

The pair of projections 5C are used to align the optical connector 5 on an optical connector guide member 12 of a cartridge 11 (see FIG. 5) to be described later. Although details will be described later, the optical connector guide member 12 has a concave groove 31 (see FIG. 8) in which the optical connector 5 fits. The pair of projections 5C are formed to fit in concave portions 31a formed in the side walls of the concave groove 31. As shown in FIG. 8, each of the concave portions 31a is formed into such a shape that partially recesses the side wall of the concave groove 31 at the center in the longitudinal direction.

Figure 19:
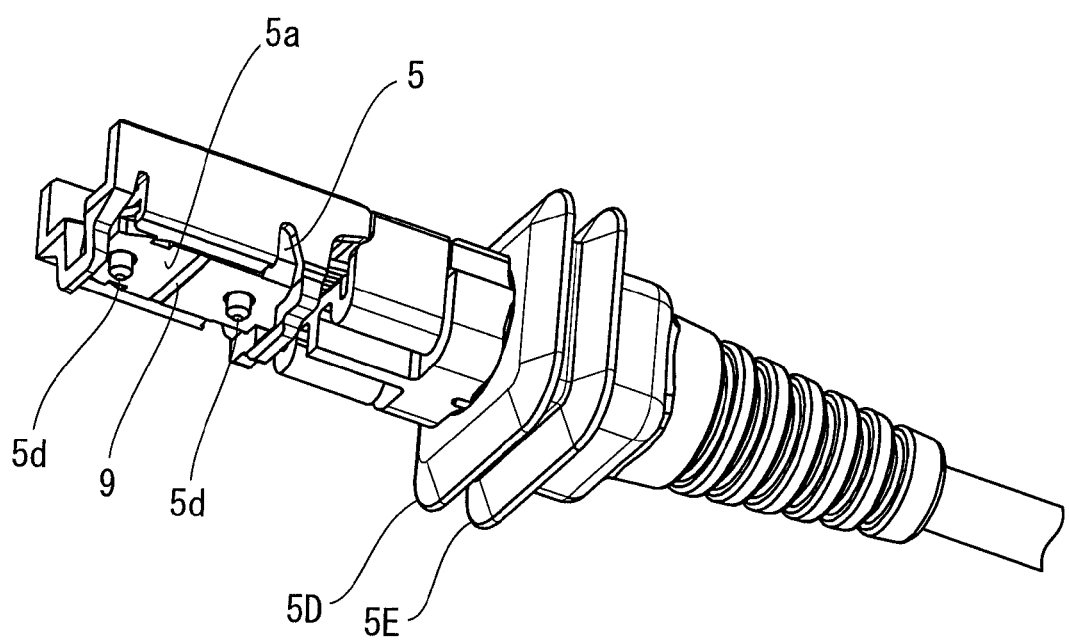
FIG. 19 is a perspective view showing another example of the optical connector.

As the optical connector 5, a so-called cable-type connector as shown in FIG. 19 is usable. The cable-type optical connector 5 includes two flange-shaped boots 5D and 5E that extend in directions perpendicular to the longitudinal direction of the optical fiber 8. Each of the boots 5D and 5E is formed into a rounded rectangular shape when viewed from the distal end of the optical connector 5.

As shown in FIG. 8, the optical connector guide member 12 to be described later includes cable guides 12A and 12B (see FIG. 8) in which the boot 5D fits to align the cable-type optical connector 5. The cable guide 12A is formed at one end of the optical connector guide member 12 to laterally project from a cartridge main body 13 to be described later. The cable guide 12B is formed at the other end of the optical connector guide member 12 to laterally project from a cartridge cover 14 to be described later.

Each of the cable guides 12A and 12B includes a pair of guide pieces 12D having an L-shaped section and facing each other to form a groove 12C in which the boot 5D can fit. When attaching the cable-type optical connector 5 to the optical connector guide member 12, the boot 5D is fitted in one of the cable guides 12A and 12B from above the optical connector guide member 12 (in FIG. 8, from the near side of the drawing surface of FIG. 8 in a direction perpendicular to the drawing surface), and the optical connector 5 is fitted in the concave groove 31 of the optical connector guide member 12. That is, the optical connector guide member 12 according to this embodiment can receive the cable-type optical connector 5 in both a case in which the distal end of the optical connector 5 is oriented to one side indicated by an arrow A in FIG. 8 and a case in which the distal end of the optical connector 5 is oriented to the other side indicated by an arrow B in FIG. 8.

Two guide pins 5d are formed on the side surface 5a of the optical connector 5 shown in FIGS. 15 and 19. The guide pins 5d are formed to fit in a pair of holes 10b of the optical module 10, respectively. The coupling face 9 is formed at a position sandwiched between the two guide pins 5d. A light emitting/receiving element 10c of the optical module 10 is provided between the pair of holes 10b.

The connector connection portion 6 is formed from the optical connector guide member 12 of the cartridge 11 (see FIG. 5) to be described later.

Figure 1:
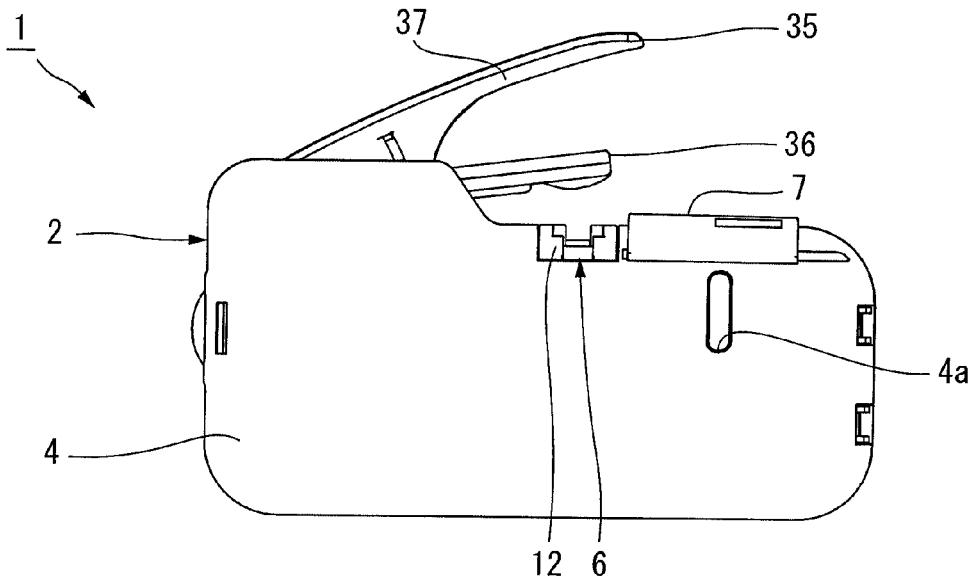
FIG. 1 is a side view of an optical connector cleaner.
Figure 2:
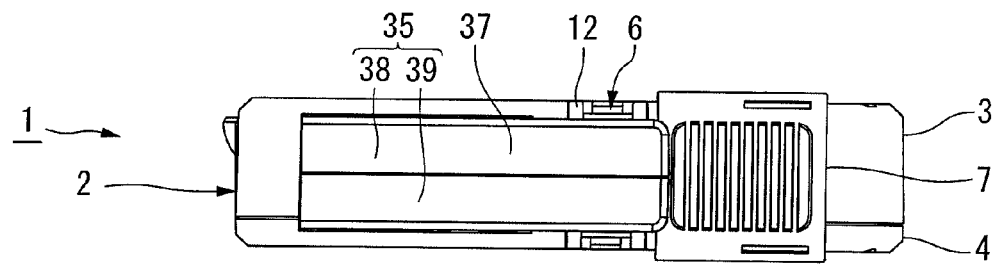
FIG. 2 is a plan view of the optical connector cleaner.
Figure 3:
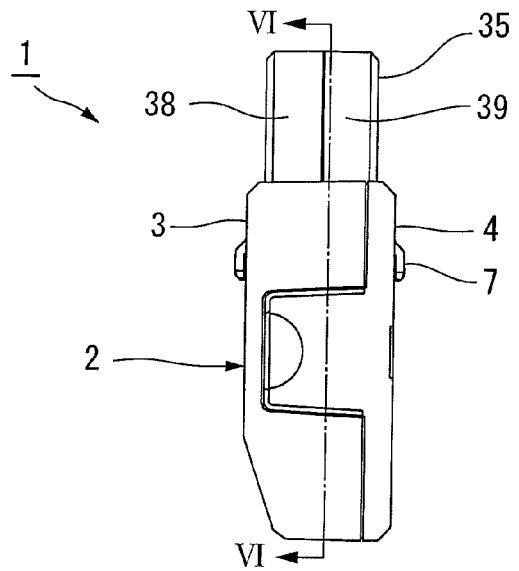
FIG. 3 is a front view of the optical connector cleaner.
Figure 4:
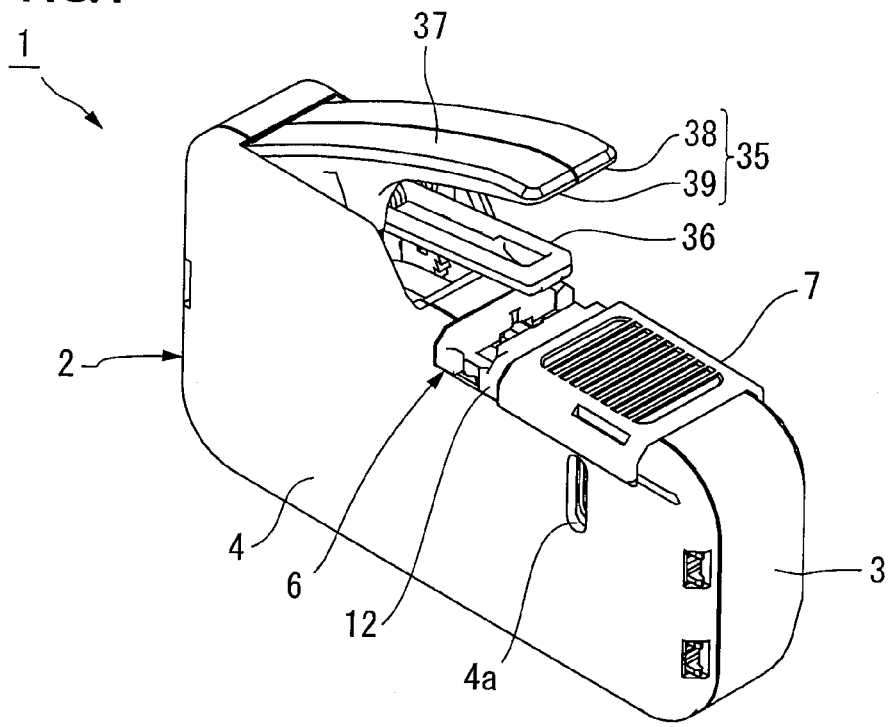
FIG. 4 is a perspective view of the optical connector cleaner.
Figure 5:
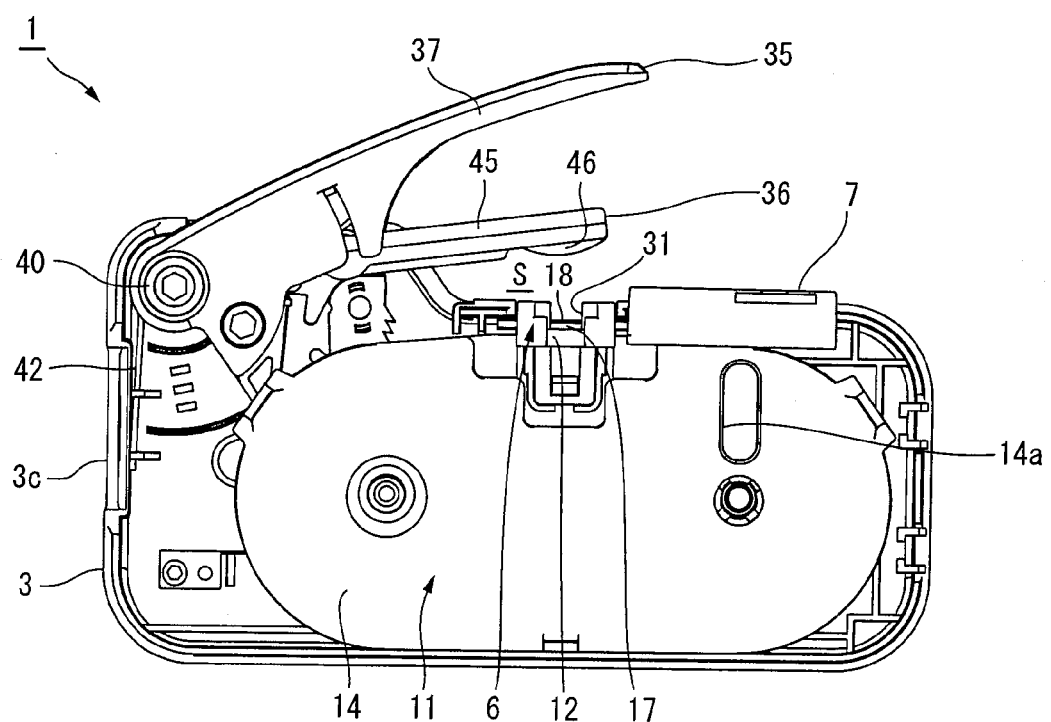
FIG. 5 is a side view showing a state in which the cover of the optical connector cleaner is removed.

As shown in FIG. 5, the cartridge 11 includes the cartridge main body 13 and the cartridge cover 14 which are formed into a box shape, a cleaning cord supply reel 15 and a take-up reel 16 which are stored in these members, the optical connector guide member 12, and a pressure receiving member 17 to be described later. The cartridge 11 is detachably supported by the body 3 in a state in which the optical connector guide member 12 is exposed to the outside of the body 3. As shown in FIG. 5, a long hole 14a is formed in the cartridge cover 14 at a position opposing the cleaning cord supply reel 15 such that the user can see the remaining amount of a cleaning cord 18 (see FIG. 6) to be described later from the outside of the cartridge 11. Note that the cover 4 of the case 2 has a long hole 4a (see FIGS. 1, 4, and 12) at a position opposing the long hole 14a. That is, the remaining amount of the cleaning cord 18 can visually be recognized from the outside of the case 2.

The cleaning cord supply reel 15 is formed from a pair of discs 15a and 15b and a shaft 15c. The shaft 15c is connected to a support shaft 3a (see FIG. 12) of the body 3 when inserting the cartridge 11 into the body 3. The support shaft 3a is inserted into the shaft 15c. The cleaning cord supply reel 15 is rotatably supported by the support shaft 3a in a state in which the cartridge 11 is inserted in the body 3.

The unused cleaning cord 18 is stored while being wound on the cleaning cord supply reel 15. The cleaning cord 18 is made of ultrafine fibers. In this embodiment, the cleaning cord 18 corresponds to a "cleaning cloth member" of the present invention. The "cleaning cloth member" is not limited to the cleaning cord 18 according to the embodiment and can be changed as needed. For example, the "cleaning cloth member" can be constructed by forming a tape of woven or unwoven fabric made of a microfiber or finishing the fabric into a tape shape. The "cleaning cloth member" can also be constructed by bundling or knitting the cleaning cord 18.

Figure 10:
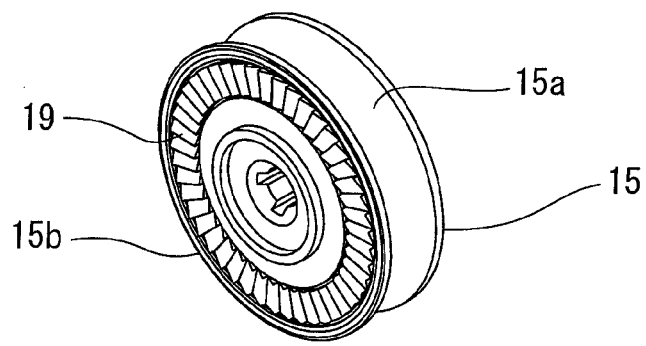
FIG. 10 is a perspective view of a cleaning cord supply reel.

Out of the discs 15a and 15b, the disc 15a facing the cartridge cover 14 is made of a transparent material so as to enable to visually recognize the remaining amount of the cleaning cord 18. Note that all constituent members of the cleaning cord supply reel 15 may be made of a transparent material. In addition, an uneven portion 19 that comes into contact with the body 3 of the case 2 is annularly formed on the outer peripheral portion of the disc 15b facing the cartridge main body 13, as shown in FIG. 10. The uneven portion 19 prevents the cleaning cord supply reel 15 from rotating in the reverse direction and is configured to engage with a projection (not shown) of the cartridge main body 13.

Figure 9:
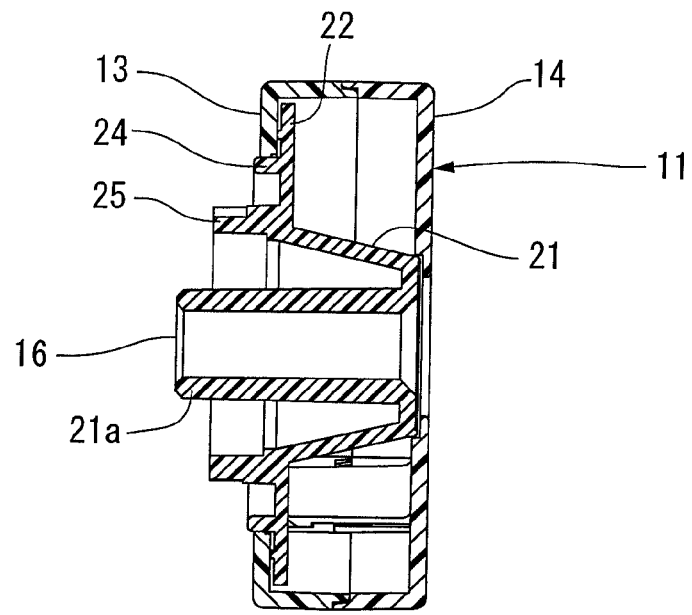
FIG. 9 is a sectional view taken along a line IX-IX in FIG. 7.
Figure 11:
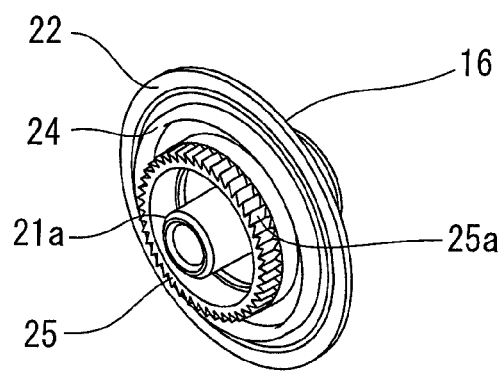
FIG. 11 is a perspective view of a take-up reel.
Figure 14:
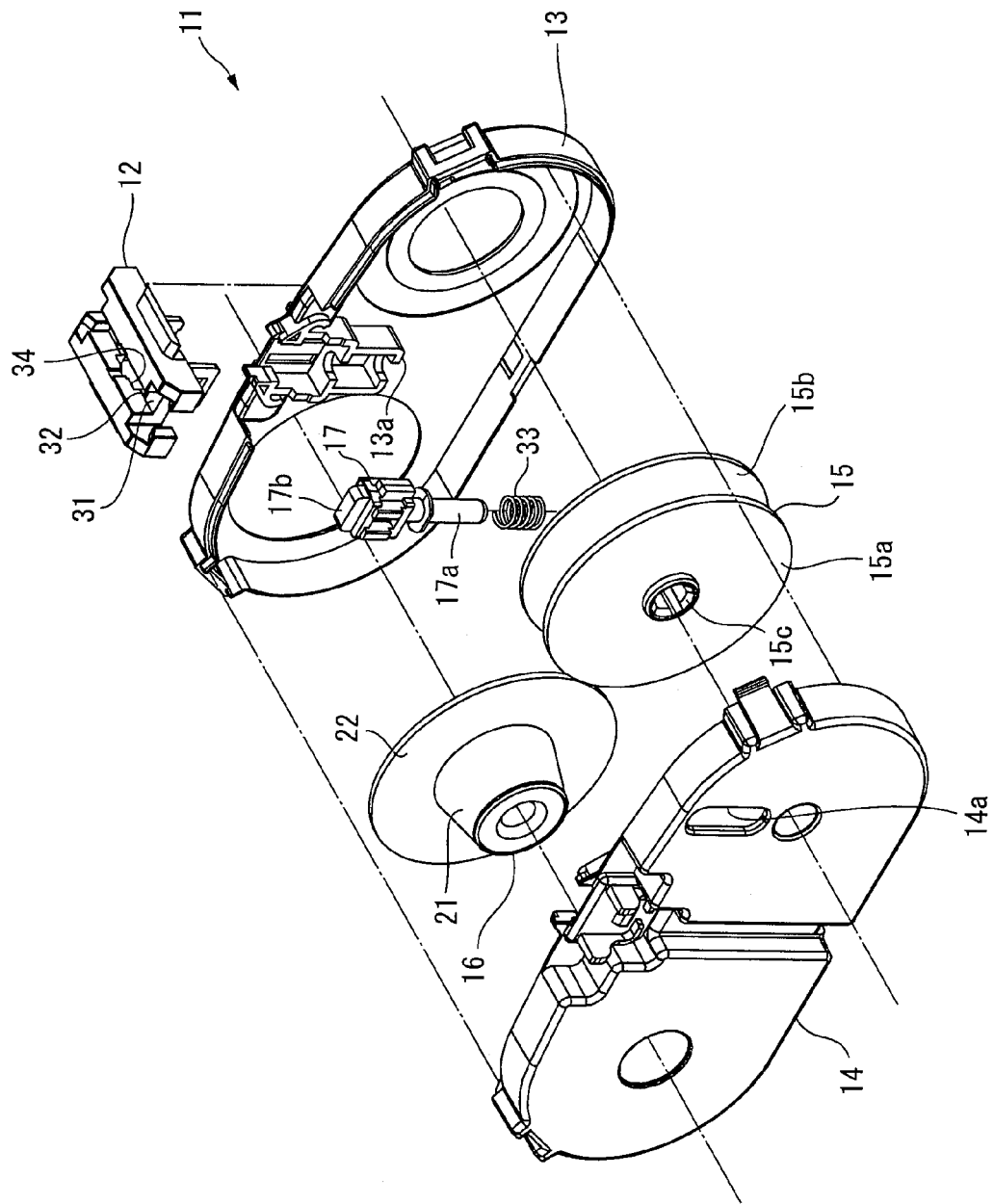
FIG. 14 is an exploded perspective view of the cartridge.

The take-up reel 16 is used to take up the cleaning cord 18. The take-up reel 16 is formed from a shaft portion 21 to take up the cleaning cord 18, and a disc portion 22 provided on one end side of the shaft portion 21 in the axial direction, as shown in FIGS. 9, 11, and 14. The shaft portion 21 is formed into a cylindrical shape whose diameter gradually decreases from one end side to the other end side in the axial direction.

The cleaning cord 18 is passed through a cord path 23 (see FIG. 6) formed in the cartridge main body 13 and the cartridge cover 14 and guided to one end side (large diameter side) of the shaft portion 21, as indicated by the alternate long and two short dashed line in FIG. 9. The cleaning cord 18 is wound on the large diameter portion of the shaft portion 21 once to several times at the same position in the axial direction and then drops to the small diameter side. After wound on the small diameter side several times, the cleaning cord 18 further drops to the smaller diameter side. That is, when the take-up reel 16 takes up the cleaning cord 18, the take-up position of the cleaning cord 18 moves from the thick portion to the thin portion of the shaft portion 21.

A cylindrical support shaft 21a is integrated with the axis of the shaft portion 21. The support shaft 21a is connected to a column 3b of the body 3 when attaching the cartridge 11 to the body 3. The column 3b is inserted into the support shaft 21a. The take-up reel 16 is rotatably supported by the column 3b in a state in which the cartridge 11 is inserted in the body 3.

Figure 17:
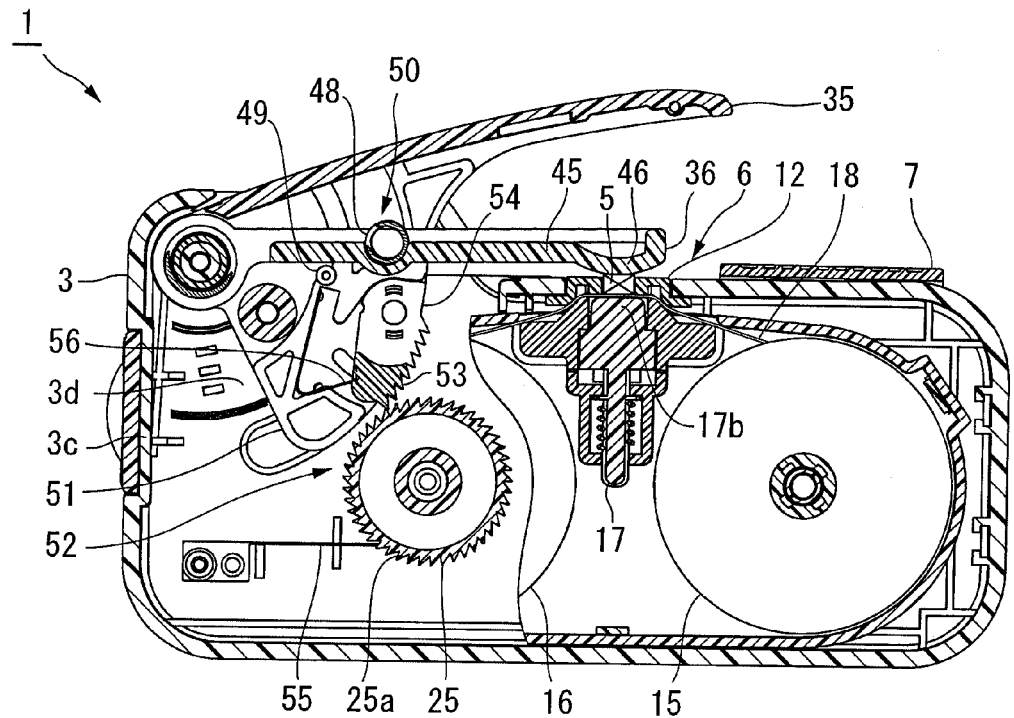
FIG. 17 is an enlarged sectional view of a part of an optical connector holder in a state in which a holding member holds the optical connector.

A tubular wall 24 that rotatably fits on the cartridge main body 13 is formed on the outer peripheral portion of the disc portion 22. A gear 25 is formed on the axis side of the disc portion 22. Teeth 25a of the gear 25 are serrated, as shown in FIG. 17. Each tooth 25a tilts in a direction reverse to the rotation direction (counterclockwise in FIG. 1) of the take-up reel 16 upon taking up the cleaning cord 18.

Figure 7:
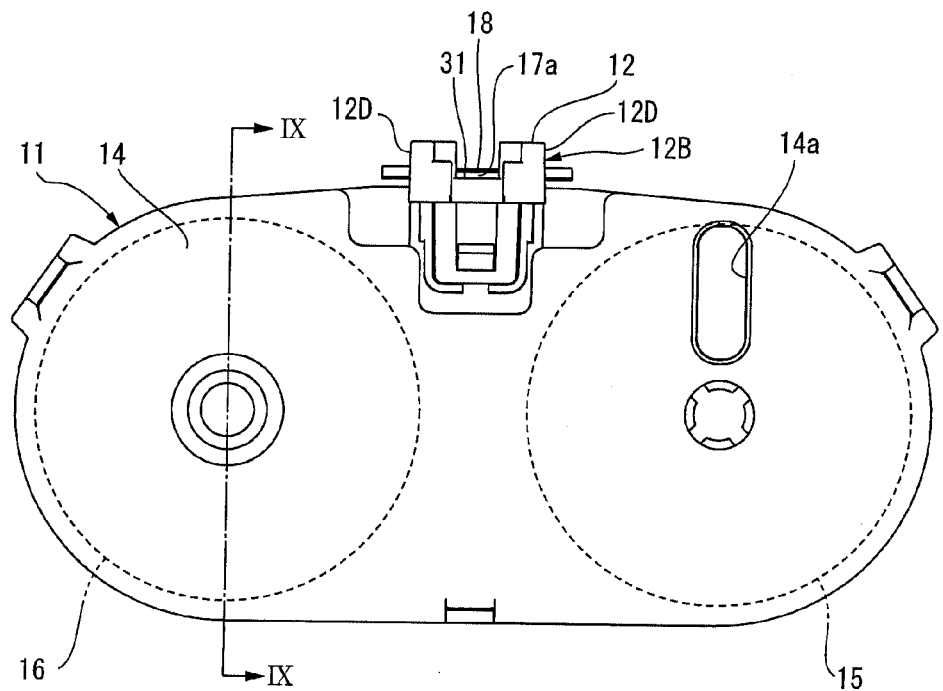
FIG. 7 is a side view of a cartridge.

The optical connector guide member 12 is attached to the cartridge main body 13 and the cartridge cover 14 while sitting across them, as shown in FIGS. 7 and 8. The attachment position of the guide member 12 corresponds to the cord path 23 in the cartridge main body 13 and the cartridge cover 14. The guide member 12 has a concave groove 31 in which the optical connector 5 detachably fits. The concave groove 31 is formed to run parallel to the axial direction of the reels 15 and 16. The concave groove 31 has such a groove width as to receive the optical connector 5 with the cover 5A attached. A through hole 32 is formed on the bottom of the concave groove 31, as shown in FIG. 8. The through hole 32 is formed to receive the two guide pins 5d of the optical connector 5.

The cleaning cord 18 passing through the cord path 23 is exposed from the through hole 32 to the outside of the cartridge 11. That is, the connector connection portion 6 formed from the optical connector guide member 12 is the portion where the cleaning cord 18 stretched from the cleaning cord supply reel 15 to the take-up reel 16 is exposed to the outside of the case 2. Note that the structure to connect the optical connector 5 to the optical connector guide member 12 can be changed as needed in correspondence with the shape of the optical connector 5.

Figure 6:
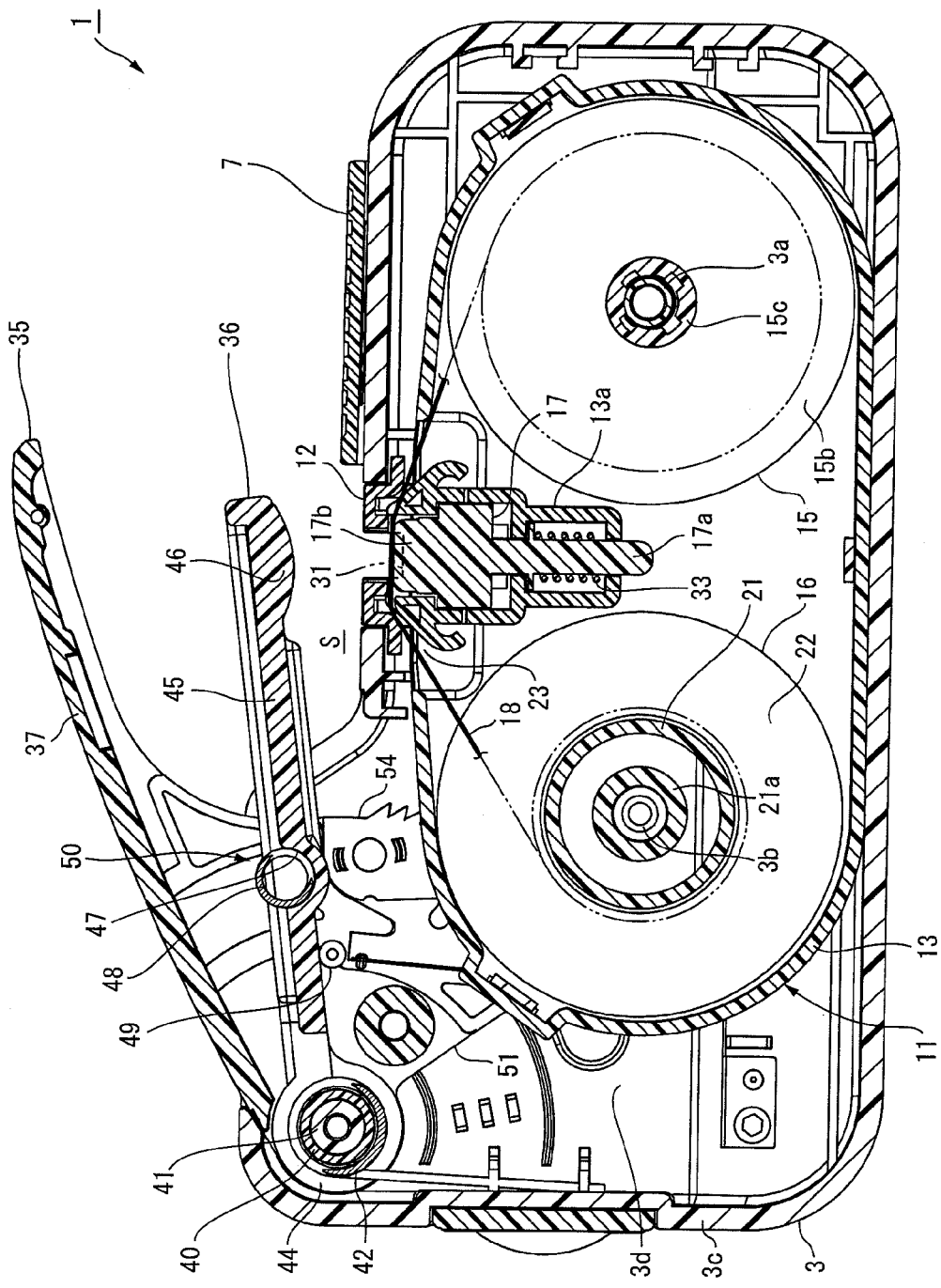
FIG. 6 is a sectional view of the optical connector cleaner taken along a line VI-VI in FIG. 3.

The pressure receiving member 17 supports the cleaning cord 18 from the side opposite to the optical connector 5 at the time of cleaning to be described later. As shown in FIG. 6, the pressure receiving member 17 is supported at the position sandwiched between the two reels 15 and 16 in the cartridge main body 13 to be movable in the moving direction of the cleaning cord 18 and the direction (upper direction in FIG. 6) perpendicular to the axial direction of the two reels 15 and 16. The pressure receiving member 17 is also biased by a helical compression spring 33 provided between one end portion 17a and the cartridge main body 13 outward from the cartridge 11 (toward the concave groove 31 of the optical connector guide member 12). Movement of the pressure receiving member 17 to the side of the optical connector guide member 12 is controlled by a pressure receiving member support wall 13a (see FIG. 6) of the cartridge main body 13.

Figure 16:
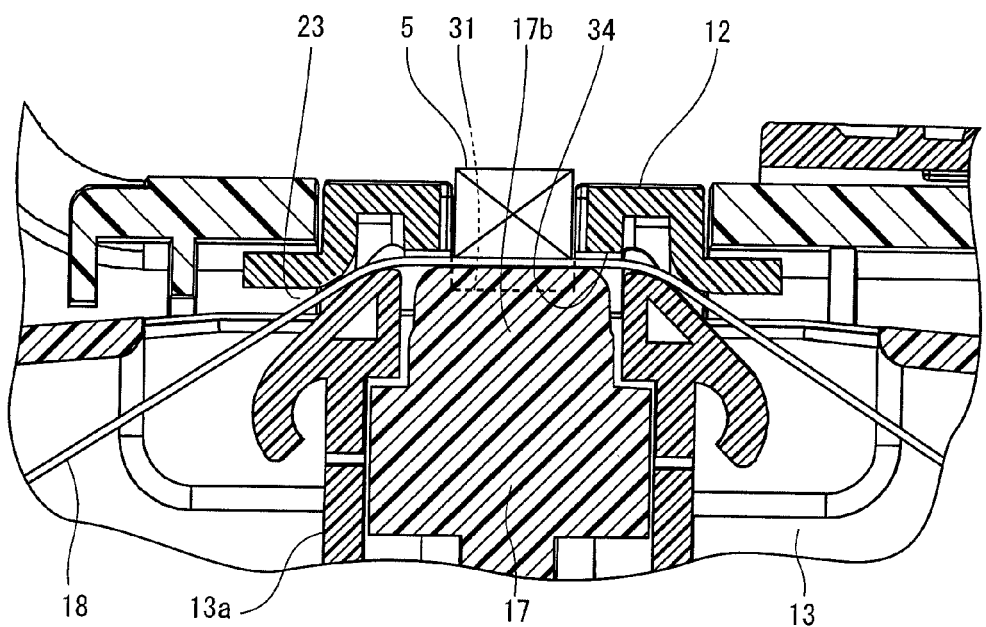
FIG. 16 is an enlarged sectional view of a connector connection portion in a state in which the optical connector is loaded.

A distal end 17b located on the other end side of the pressure receiving member 17 forms part of the bottom of the cord path 23 and is inserted into a concave portion 34 (see FIG. 16) formed in the optical connector guide member 12 from the inside of the cartridge. The concave portion 34 is formed at a position corresponding to the through hole 32 in the optical connector guide member 12 so that part of the pressure receiving member 17 is inserted into the through hole 32. As shown in FIG. 16, the distal end 17b of the pressure receiving member 17 projects outward from the bottom of the concave groove 31 while being inserted into the concave portion 34. That is, before the optical connector 5 is loaded in the optical connector guide member 12, the cleaning cord 18 pressed to the outside of the cartridge by the pressure receiving member 17 runs across the inside of the concave groove 31.

As shown in FIG. 5, an operation lever 35 and a holding member 36 are provided at one side portion of the body 3 of the case 2, as shown in FIG. 5. The user operates the operation lever 35 at the time of cleaning. The holding member 36 holds the optical connector 5 on the case 2, that is, the connector connection portion 6.

The operation lever 35 has an operation portion 37 projecting from the case 2. The operation portion 37 is swingably supported at one side portion of the case 2 so as to come into contact with or separate from the connector connection portion 6. The operation lever 35 according to this embodiment is formed by coupling a sublever 39 with a main lever 38, as shown in FIG. 13.

Figure 13:
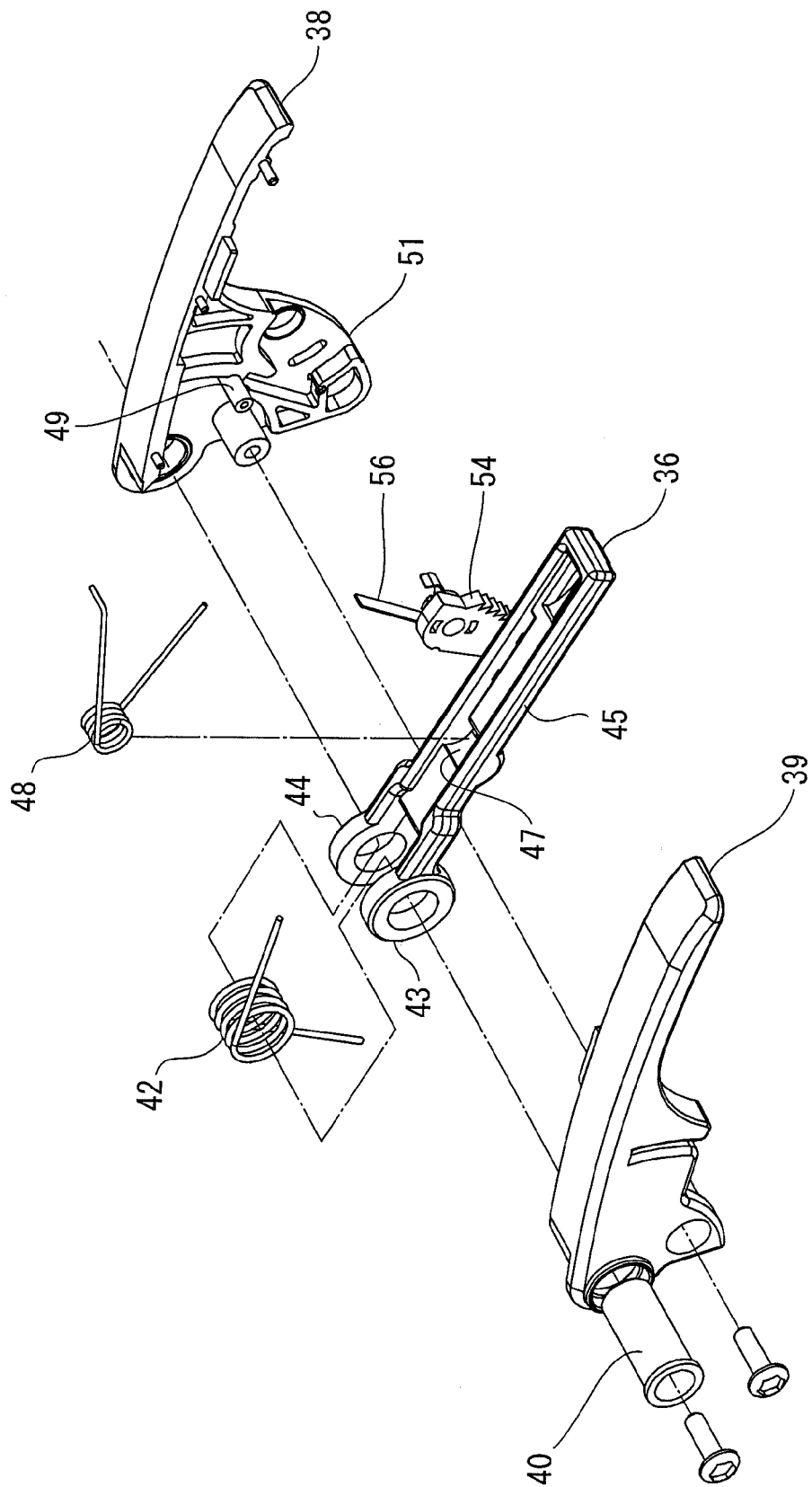
FIG. 13 is an exploded perspective view of an operation lever and a pressing member.

A tubular shaft 40 shown in FIG. 13 pivotally fits at the swing center of the operation lever 35. The tubular shaft 40 is fixed to a support rod 41 (see FIG. 12) that extends through the operation lever 35 and the holding member 36 to be described later and stands at one side portion of the body 3. The support rod 41 is inserted into the tubular shaft 40. The tubular shaft 40 and the support rod 41 extend parallel to the axial direction of the cleaning cord supply reel 15 and the take-up reel 16. A first torsion coil spring 42 (see FIG. 13) is attached to the tubular shaft 40 to bias the operation lever 35 such that it returns to the initial position shown in FIG. 5. One end portion of the first torsion coil spring 42 contacts a side wall 3c (see FIG. 5) of the body 3, and the other end portion contacts the operation lever 35.

As shown in FIG. 13, the holding member 36 includes a pair of boss portions 43 and 44 in which the tubular shaft 40 pivotally fits, and a press arm 45 integrated with the boss portions 43 and 44. That is, the swing axis of the press arm 45 is located on the same line as the swing axis of the operation lever 35. The first torsion coil spring 42 is inserted between one boss portion 43 and the other boss portion 44. The press arm 45 is formed to be located between the connector connection portion 6 and the operation portion 37 of the operation lever 35. Note that the position of the swing axis of the press arm 45 is not limited to the position on the same line as the swing axis of the operation lever 35. That is, the swing axis of the press arm 45 may be arranged independently at a position different from the swing center of the operation lever 35 or may be provided on the same line as another axis (not shown). Providing the swing axis of the press arm 45 at a position different from the swing axis of the operation lever 35 allows to make the diameters and axial widths of the swing axes small. When the axial widths of the swing axes are small, the widths of the press arm 45 and the operation lever 35 can be small.

A presser 46 (see FIG. 5) for pressing the optical connector 5 loaded in the connector connection portion 6 is provided at the distal end of the press arm 45 facing the connector connection portion 6.

A concave portion 47 is formed at the intermediate portion of the press arm 45 so as to open toward the operation portion 37 of the operation lever 35, as shown in FIG. 6. The coil portion of a second torsion coil spring 48 is inserted into the concave portion 47. The second torsion coil spring 48 biases the press arm 45 to the side of the connector connection portion 6 with respect to the operation lever 35. One end portion of the second torsion coil spring 48 contacts the press arm 45, and the other end portion contacts the operation lever 35.

In the initial state in which the operation lever 35 is located at the initial position, as shown in FIG. 6, the press arm 45 is biased by the spring force of the second torsion coil spring 48 and pressed against a stopper 49 of the operation lever 35. The stopper 49 is formed from a cylindrical pin standing on the main lever 38. The stopper 49 allows the press arm 45 to swing in the direction in which the interval between the operation lever 35 and the press arm 45 decreases.

The stopper 49 also controls swing of the press arm 45 in the direction in which the interval exceeds a predetermined interval (the interval in the initial state shown in FIG. 6). In this embodiment, the second torsion coil spring 48 constitutes the "spring" of the invention described in claim 3. That is, the second torsion coil spring 48 and the stopper 49 form a press mechanism 50 provided between the operation lever 35 and the holding member 36.

The press mechanism 50 transmits the operation force applied to the operation lever 35 to the holding member 36 via the second torsion coil spring 48. The press arm 45 of the holding member 36 is connected to the operation lever 35 by the press mechanism 50 and therefore moves toward the connector connection portion 6 when the operation lever 35 is operated from the initial position shown in FIG. 6. The user loads the optical connector 5 on the connector connection portion 6 in advance. When the operation lever 35 is further operated, the presser 46 of the press arm 45 comes into contact with the optical connector 5, as shown in FIG. 17. When the operation lever 35 is further operated in this state, the operation force is transmitted to the press arm 45 via the second torsion coil spring 48, and the presser 46 is pressed against the optical connector 5. For this reason, the optical connector 5 is pressed by the presser 46 against the optical connector guide member 12 of the connector connection portion 6.

Figure 18:
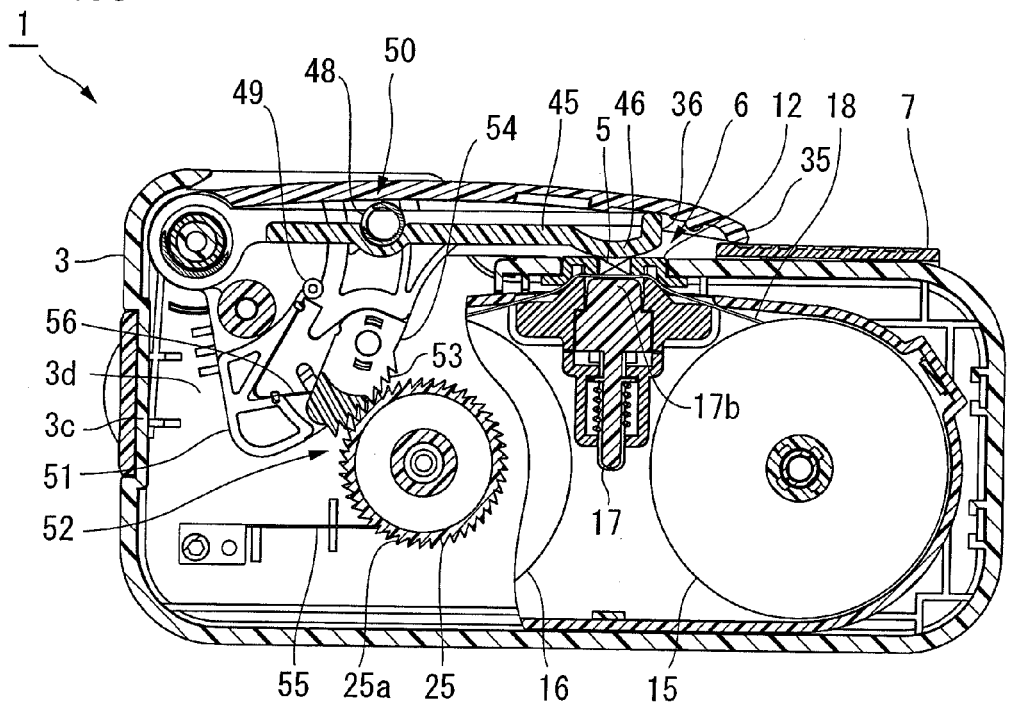
FIG. 18 is an enlarged sectional view of a part of the optical connector holder in a state in after cleaning has ended.

As shown in FIG. 17, a driving arm 51 extending toward the take-up reel 16 is formed at the portion of the operation lever 35 located in the case 2. FIGS. 17 and 18 are partially cutaway views of the optical connector cleaner 1, which illustrate the driving arm 51 and the gear 25 of the take-up reel 16. The driving arm 51 is formed so as to conform to a bottom wall 3*d* of the body 3 having a box shape. The driving arm 51 forms part of a take-up mechanism 52 that rotates the take-up reel 16 in the take-up direction by a predetermined angle at a predetermined timing. To implement the above-described function, the take-up mechanism 52 according to this embodiment adopts the same structure as that of a ratchet-type one-way clutch.

As shown in FIG. 17, the take-up mechanism 52 includes the gear 25 of the take-up reel 16, a ratchet gear 54 having teeth 53 that mesh with the gear 25, and a backlash spring 55 for controlling reverse rotation of the gear 25. The ratchet gear 54 forms a so-called sector gear. The driving arm 51 swingably supports the ratchet gear 54 while controlling its swing range. In addition, the ratchet gear 54 is biased by a leaf spring 56 so as to be located at the mesh position shown in FIG. 17. That is, when the user operates the operation lever 35 in the state in which the ratchet gear 54 meshes with the gear 25, the take-up mechanism 52 rotates the take-up reel 16 in the take-up direction by a predetermined angle.

The teeth 53 of the ratchet gear 54 are formed to mesh with the gear 25 in the state in which the operation lever 35 is operated by a predetermined angle. In this embodiment, the predetermined angle is that angle at which the presser 46 is pressed against the optical connector 5 loaded on the connector connection portion 6. For this reason, in this embodiment, the press mechanism 50 presses the holding member 36 against the optical connector 5 before the take-up reel 16 starts rotating by the driving of the take-up mechanism 52.

The operation of the optical connector cleaner 1 having the above-described arrangement at the time of cleaning will be described next with reference to FIGS. 16 to 18.

The operation lever 35 of the optical connector cleaner 1 according to this embodiment is located at the initial position shown in FIG. 6 in the initial state in which the user grips the case 2. In this initial state, the cleaning cord 18 is exposed into the concave groove 31 of the optical connector guide member 12 while being supported by the pressure receiving member 17, as shown in FIG. 16.

The optical connector 5 to be cleaned is inserted into the concave groove 31 such that the coupling face 9 comes into contact with the cleaning cord 18.

After the optical connector 5 is loaded on the optical connector guide member 12, as described above, the user grips the operation lever 35 and swings it against the spring force of the first torsion coil spring 42, thereby cleaning the optical connector. When the operation lever 35 swings, the press arm 45 of the holding member 36 follows it and swings in the same direction. When the operation lever 35 is continuously operated to swing, the presser 46 of the press arm 45 is pressed against the optical connector 5, and the holding member 36 holds the optical connector 5 in the case 2, as shown in FIG. 17.

At this time, the operation force applied to the operation lever 35 is transmitted to the press arm 45 via the second torsion coil spring 48. That is, the optical connector 5 is held in the case 2 by the spring force of the second torsion coil spring 48. In this holding state, the cleaning cord 18 is sandwiched between the optical connector 5 and the pressure receiving member 17.

When the operation lever 35 further swings in the state in which the optical connector 5 is held on the connector connection portion 6 of the case 2 by the holding member 36, the ratchet gear 54 of the take-up mechanism 52 meshes with the gear 25 of the take-up reel 16, and the take-up reel 16 rotates in the take-up direction by a predetermined angle, as shown in FIG. 18. As a result, the cleaning cord 18 that is wound on the take-up reel 16 moves from the side of the cleaning cord supply reel 15 to the side of the take-up reel 16 while wiping the coupling face 9 of the optical connector 5. The coupling face 9 is wiped by the cleaning cord 18 and thus cleaned.

After the cleaning, when the user releases the operation lever 35, it returns to the initial position due to the spring force of the first torsion coil spring 42. At this time, the ratchet gear 54 swings against the spring force of the leaf spring 56. The teeth 53 move over the teeth 25*a* of the gear 25 and unmesh from them, and then return to the initial position in synchronous with the operation lever 35. The reverse rotation of the take-up reel 16 when the teeth 53 of the ratchet gear 54 move over the teeth 25*a* is controlled by the backlash spring 55 that meshes with the teeth 25*a*.

In the optical connector cleaner 1 according to this embodiment, the force of pressing the coupling face 9 of the optical connector 5 against the cleaning cord 18 is applied by causing the holding member 36 to hold the optical connector 5. For this reason, the force is not affected by the magnitude of the operation force of the user and is almost constant even if the user changes. In addition, the moving length of the cleaning cord 18 at the time of cleaning corresponds to the operation amount of the operation lever 35. For this reason, the cleaning cord 18 moves from one end to the other end of the movable range of the operation lever 35 in a proper length at the time of cleaning.

Hence, the optical connector cleaner 1 according to this embodiment can always obtain a constant cleaning result even if the user has changed.

In the optical connector cleaner 1 according to this embodiment, the press mechanism 50 is provided between the operation lever 35 and the holding member 36. The press mechanism 50 transmits the operation force applied to the operation lever 35 to the holding member 36 and presses the holding member 36 against the optical connector 5 at a predetermined timing with respect to the timing the take-up reel 16 starts rotating by the driving of the take-up mechanism 52. The "predetermined timing" of this embodiment is the timing before the time the take-up reel 16 starts rotating.

For this reason, when the user operates the operation lever 35, the holding member 36 holds the optical connector 5 on the connector connection portion 6. That is, holding the optical connector 5 and moving the cleaning cloth member can be done at once by operating the operation lever 35.

Hence, the optical connector cleaner 1 according to this embodiment allows the user to complete cleaning of the optical connector 5 by one operation at the time of cleaning.

Note that the timing the press mechanism 50 presses the holding member 36 against the optical connector 5 is not limited to the above-described timing "before the take-up reel 16 rotates, and can also be set to the timing "after the take-up reel 16 has rotated", or the "same timing as the take-up reel 16 rotates". The change of the timing can be implemented by, for example, forming the stopper 49 or the teeth 53 of the ratchet gear 54 at a position different from that in the above-described embodiment.

When the timing the press mechanism 50 presses the holding member 36 against the optical connector 5 is set to the timing "before the take-up reel 16 rotates", the optical connector 5 can be held and stabilized reliably. In addition, since the moving amount of the cleaning cord 18 can be small, the number of times of cleaning can be increased using the cord in the same length.

When the timing is set to the timing "after the take-up reel 16 has rotated", the holding member 36 is pressed against the optical connector 5 after the cleaning cord 18 has started moving. In this case, the cleaning can be started without loosening the cleaning cord 18. Assume that the cleaning cord 18 has loosened at the previous time of cleaning. At this time, even when the take-up reel 16 rotates, the cleaning cord 18 may be unable to move on the end face of the connector and contribute to the cleaning. However, this can be prevented by moving the cleaning cord 18 earlier. In addition, when the portion of the cleaning cord 18 used in the previous cleaning is fed, recontamination of the coupling face 9 can be prevented.

When the timing is set to the "same timing as the take-up reel 16 rotates", no time lag is generated between the start of the operation of pressing the holding member 36 against the optical connector 5 and the start of movement of the cleaning cord 18. In this case, the time necessary for the cleaning can be shortened.

The operation lever 35 according to this embodiment is formed to swing with respect to the case 2 so that the operation portion 37 comes into contact with or separates from the connector connection portion 6. The holding member 36 includes the press arm 45 located between the connector connection portion 6 and the operation portion 37 of the operation lever 35. The holding member 36 swings with respect to the operation lever 35 so that the press arm 45 comes into contact with or separates from the optical connector 5 loaded on the connector connection portion 6. The swing axis of the press arm 45 is located on the same line as the swing axis of the operation lever 35. On the other hand, the press mechanism 50 includes the second torsion coil spring 48 that biases the press arm 45 to the side of the connector connection portion 6 with respect to the operation lever 35, and the stopper 49 that allows the interval between the operation lever 35 and the press arm 45 to decrease and controls the interval not to exceed a predetermined interval.

The press arm 45 is connected to the operation lever 35 via the press mechanism 50. Hence, the press arm 45 follows the operation lever 35 that has swung in the direction in which the operation lever 35 separates from the case 2. That is, when the operation portion 37 of the operation lever 35 largely separates from the case 2, a space S (see FIG. 5) is formed between the press arm 45 and the connector connection portion 6. The space S is formed between the case 2 and the press arm 45 so as to open to the side opposite to the swing center of the operation lever 35 and the holding member 36.

For this reason, the operation of loading the optical connector 5 on the connector connection portion 6 can easily be performed by passing the optical connector 5 through the space S so as to avoid the interference between the operation lever 35 and the holding member 36 (press arm 45). Hence, the optical connector cleaner 1 according to this embodiment allows to easily perform the loading operation of the optical connector 5.

In the optical connector cleaner 1 according to this embodiment, the portion for supporting the cleaning cord supply reel 15 and the take-up reel 16 in the case 2 is formed from one cartridge 11 that is formed to store the reels and be detachable from the remaining portions of the case 2.

Hence, in the optical connector cleaner 1 according to this embodiment, the cleaning cord 18 can be detached while being stored in the cartridge 11. Hence, the optical connector cleaner 1 according to this embodiment allows to easily exchange the cleaning cord 18 that is a consumable item.

The cartridge 11 according to this embodiment includes the optical connector guide member 12 on which the optical connector 5 detachably fits, and the pressure receiving member 17 located on the side opposite to the optical connector 5 fitting on the optical connector guide member 12 with respect to the cleaning cord 18. The optical connector guide member 12 is formed to fit in the direction in which the optical connector 5 is pressed by the holding member 36. The pressure receiving member 17 presses the optical connector 5 via the cleaning cord 18 by the spring force of the helical compression spring 33.

Since the optical connector guide member 12 for connecting the optical connector 5 is provided for each cartridge 11, the cartridge 11 can be formed for each type of the optical connector 5. Hence, according to this embodiment, preparing the cartridge 11 for each type of the optical connector 5 in advance makes it possible to provide an optical connector cleaner capable of cleaning many types of optical connectors 5 without changing other parts such as the operation lever 35 and the holding member 36.

The shaft portion 21 of the take-up reel 16 according to this embodiment, which takes up the cleaning cord 18, is formed to gradually decrease the diameter from one end to the other end in the axial direction. For this reason, when the take-up reel 16 takes up the cleaning cord 18, the take-up position of the cleaning cord 18 moves from the thick portion to the thin portion of the shaft portion 21. Since the cleaning cord 18 is taken up by the shaft portion 21 through a wide range in the axial direction, the long cleaning cord 18 can be stored in the case 2 and the number of times of cleaning can be increased. In addition, since the shaft portion 21 is formed to gradually decrease the diameter, the fall amount of the cleaning cord 18 that is wound on the large diameter side and drops to the small diameter side can be decreased. This allows to prevent the cleaning cord 18 from loosening.

The optical connector 5 used in the optical connector cleaner 1 according to this embodiment has the coupling face 9 formed on one side surface in the direction perpendicular to the longitudinal direction of the optical fiber 8. The optical connector 5 is loaded on the connector connection portion 6 such that the longitudinal direction becomes almost parallel to the axial direction of the take-up reel 16.

For this reason, the optical connector cleaner 1 according to this embodiment can clean the coupling face 9 formed on the side surface of the optical connector 5.

The invention claimed is:

1. An optical connector cleaner comprising:
   a supply reel that stores a cleaning cloth member having one end side wounded thereon;
   a take-up reel that takes up the other end side of the cleaning cloth member;
   a case that has a connector connection portion on which the cleaning cloth member stretched from said supply reel to said take-up reel is exposed, and rotatably supports said supply reel and said take-up reel;
   an operation lever that has an operation portion projecting from said case and is swingably supported by said case;
   a take-up mechanism that is provided between said operation lever and said take-up reel and rotates said take-up reel in a take-up direction by a predetermined angle when the operation lever swings; and
   a holding member that holds an optical connector on the connector connection portion in a state in which a coupling face of the optical connector is pressed against the cleaning cloth member exposed to the connector connection portion
   wherein a press mechanism is provided between said operation lever and said holding member, said press mechanism transmitting, to said holding member, an operation force applied to said operation lever and pressing said holding member against the optical connector at a predetermined timing with respect to a timing said take-up reel starts rotating by driving of said take-up mechanism.

2. An optical connector cleaner according to claim 1, wherein
   said operation lever is formed to swing with respect to said case so that the operation portion comes into contact with or separates from the connector connection portion,
   said holding member comprises a press arm located between the connector connection portion and the operation portion of said operation lever, and swings with respect to said operation lever so that said press arm comes into contact with or separates from the optical connector loaded on the connector connection portion, and
   said press mechanism comprises:
   a spring that biases said press arm to a side of the connector connection portion with respect to said operation lever; and
   a stopper that allows an interval between said operation lever and said press arm to decrease and controls the interval not to exceed a predetermined interval.

3. An optical connector cleaner according to claim 1, wherein
   a portion for supporting said supply reel and said take-up reel in said case is formed from one cartridge that is formed to store said supply reel and said take-up reel and be detachable from remaining portions of said case.

4. An optical connector cleaner according to claim 1, wherein
   a shaft portion of said take-up reel, which takes up the cleaning cloth member, is formed to gradually decrease a diameter from one end to the other end in an axial direction.

5. An optical connector cleaner according claim 1, wherein
   the optical connector has the coupling face formed on one side surface in a direction perpendicular to a longitudinal direction of an optical fiber, and is loaded on the connector connection portion such that the longitudinal direction becomes parallel to the axial direction of said take-up reel.

6. An optical connector cleaner comprising:
   a supply reel that stores a cleaning cloth member having one end side wounded thereon;
   a take-up reel that takes up the other end side of the cleaning cloth member;
   a case that has a connector connection portion on which the cleaning cloth member stretched from said supply reel to said take-up reel is exposed, and rotatably supports said supply reel and said take-up reel;
   an operation lever that has an operation portion projecting from said case and is swingably supported by said case;
   a take-up mechanism that is provided between said operation lever and said take-up reel and rotates said take-up reel in a take-up direction by a predetermined angle when the operation lever swings; and
   a holding member that holds an optical connector on the connector connection portion in a state in which a coupling face of the optical connector is pressed against the cleaning cloth member exposed to the connector connection portion;
   wherein a portion for supporting said supply reel and said take-up reel in said case is formed from one cartridge that is formed to store said supply reel and said take-up reel and be detachable from remaining portions of said case;
   wherein said cartridge comprises:
   a guide member on which the optical connector detachably fits; and
   a pressure receiving member located on a side opposite to the optical connector fitting on said guide member with respect to the cleaning cloth member,
   said guide member being formed to fit in a direction in which the optical connector is pressed by said holding member, and
   said pressure receiving member pressing the optical connector via the cleaning cloth member by a spring force of a spring.

* * * * *